US012764269B2

(12) United States Patent
Pourian

(10) Patent No.: US 12,764,269 B2
(45) Date of Patent: Oct. 13, 2026

(54) GENERATION OF OPTICAL FLOW MAPS BASED ON FOREGROUND AND BACKGROUND IMAGE SEGMENTATION

(71) Applicant: Intel Corporation, Santa Clara, CA (US)

(72) Inventor: Niloufar Pourian, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/193,419

(22) Filed: Mar. 30, 2023

(65) Prior Publication Data

US 2024/0333904 A1 Oct. 3, 2024

(51) Int. Cl.
*H04N 13/264* (2018.01)
*H04N 13/271* (2018.01)
*H04N 13/00* (2018.01)

(52) U.S. Cl.
CPC ......... *H04N 13/264* (2018.05); *H04N 13/271* (2018.05); *H04N 2013/0092* (2013.01); *H04N 2013/0096* (2013.01); *H04N 2213/007* (2013.01)

(58) Field of Classification Search
CPC ............... H04N 13/264; H04N 13/271; H04N 2013/0092; H04N 2013/0096; H04N 2213/007; H04N 13/111; H04N 2013/0081; H04N 2013/0085
See application file for complete search history.

(56) References Cited

U.S. PATENT DOCUMENTS 11,546,568 B1 * 1/2023 Yoon .................... H04N 13/128
2024/0249523 A1 * 7/2024 Cole ....................... G06T 7/194

OTHER PUBLICATIONS

Wikipedia, “Optical Flow,” retrieved on Feb. 2, 2023 from <https://en.wikipedia.org/wiki/Optical_flow>, 6 pages.
Lin et al., “Real-Time High Resolution Background Matting,” 2021, the Computer Vision Foundation, 10 pages.
Sengupta et al., “Background Matting: The World is Your Green Screen,” 2020, the Computer Vision Foundation, 10 pages.
(Continued)

*Primary Examiner* — Yogesh K Aggarwal
(74) *Attorney, Agent, or Firm* — Hanley, Flight & Zimmerman, LLC

(57) ABSTRACT

Methods, apparatus, systems and articles of manufacture (e.g., physical storage media) to generate optical flow maps based on foreground and background image segmentation are disclosed. Example apparatus disclosed herein are to generate a reference optical flow map based on a stereo pair of background images corresponding to a first camera field-of-view and a second camera field-of-view, and generate a first optical flow map based on a stereo pair of input images corresponding to the first camera field-of-view and the second camera field-of-view. Disclosed example apparatus are also to combine the reference optical flow map and the first optical flow map based on an alpha matte to generate a second optical flow map associated with the stereo pair of input images, the alpha matte representative of segmentation of at least one of the stereo pair of input images into foreground and background regions.

20 Claims, 8 Drawing Sheets

(56) References Cited

OTHER PUBLICATIONS

Surround360, “Optical Flow,” retrieved on Mar. 8, 2023, archived Aug. 31, 2021, from <https://github.com/facebookarchive/Surround360/tree/master/surround360_render/source/optical_flow>, 1 page.
Surround360, “PixFlow.h,” retrieved on Mar. 8, 2023, archived Aug. 31, 2021, from <https://github.com/facebookarchive/Surround360/blob/master/surround360_render/source/PixFlow.h>, 12 page.
Surround360, “Render,” retrieved on Feb. 2, 2023, archived Aug. 31, 2021, from <https://github.com/facebookarchive/Surround360/tree/master/surround360_render>, 8 page.
Facebook, “Surround360,” 2016, obtained Mar. 8, 2023, design files, 68 pages.
Ilg et al., “FlowNet 2.0: Evolution of Optical Flow Estimation with Deep Networks,” obtained on Feb. 2, 2023, the Computer Vision Foundation, 9 pages.
Sun et al., “PWC-Net: CNNs for Optical Flow Using Pyramid, Warping, and Cost Volume,” obtained on Feb. 2, 2023, the Computer Vision Foundation, 10 pages.
Dosovitskiy et al., “FlowNet: Learning Optical Flow with Convolutional Networks,” obtained on Feb. 2, 2023, the Computer Vision Foundation, 9 pages.
Brox et al., “High Accuracy Optical Flow Estimation Based on a Theory of Warping,” In Proc. 8th European Conference on Computer Vision, Springer LNCS 3024, T. Pajdla and J. Matas (Eds.), vol. 4, pp. 25-36, Prague, Czech Republic, May 2004, Springer-Verlag Berlin Heidelberg 2004, 12 pages.
Sun et al., “Secrets of Optical Flow Estimation and Their Principles,” 2010, IEEE, 8 pages.
Fleet et al., “Optical Flow Estimation,” appears in Mathematical Models in Computer Vision: The Handbook, N. Paragios, Y. Chen, and O. Faugeras (editors), Chapter 15, Springer, 2005, pp. 239-258, 24 pages.
Ren et al., “Unsupervised Deep Learning for Optical Flow Estimation,” proceedings of the Thirty-First AAAI Conference on Artificial Intelligence (AAAI-17), 2017, 7 pages.
Hui et al., “LiteFlowNet: A Lightweight Convolutional Neural Network for Optical Flow Estimation,” obtained on Feb. 2, 2023, the Computer Vision Foundation, 9 pages.
Wang et al., “Occlusion Aware Unsupervised Learning of Optical Flow,” obtained on Feb. 2, 2023, the Computer Vision Foundation, 10 pages.
Shuchen Du, “Understanding Optical Flow & RAFT,” Sep. 26, 2020, Towards Data Science, retrieved on Feb. 2, 2023, from <https://towardsdatascience.com/understanding-optical-flow-raft-accb38132fba>, 9 pages.

* cited by examiner

GENERATION OF OPTICAL FLOW MAPS BASED ON FOREGROUND AND BACKGROUND IMAGE SEGMENTATION

FIELD OF THE DISCLOSURE

This disclosure relates generally to video processing and, more particularly, to generation of optical flow maps based on foreground and background image segmentation.

BACKGROUND

Many video applications utilize optical flow maps to interpolate between stereo image pairs included in input stereo video data. In some examples, each image of a stereo image pair is associated with a different camera field-of-view. Furthermore, in some such examples, each image of a stereo image pair is also associated with a respective optical flow map including an array of elements corresponding respectively to the pixels of that image. In such examples, each element of the optical flow map includes a displacement vector to map a respective pixel of that image to a corresponding pixel in the other image of the stereo image pair. Thus, video applications, such as an immersive video application, can utilize optical flow maps to interpolate between a first image in a stereo image pair and a second image in the stereo image pair to generate an interpolated image representative of a virtual camera field-of-view between a first camera field-of-view associated with the first image and a second camera field-of-view associated with the second image.

BRIEF DESCRIPTION OF THE DRAWINGS

In general, the same reference numbers will be used throughout the drawing(s) and accompanying written description to refer to the same or like parts. The figures are not to scale.

Figure 1A:
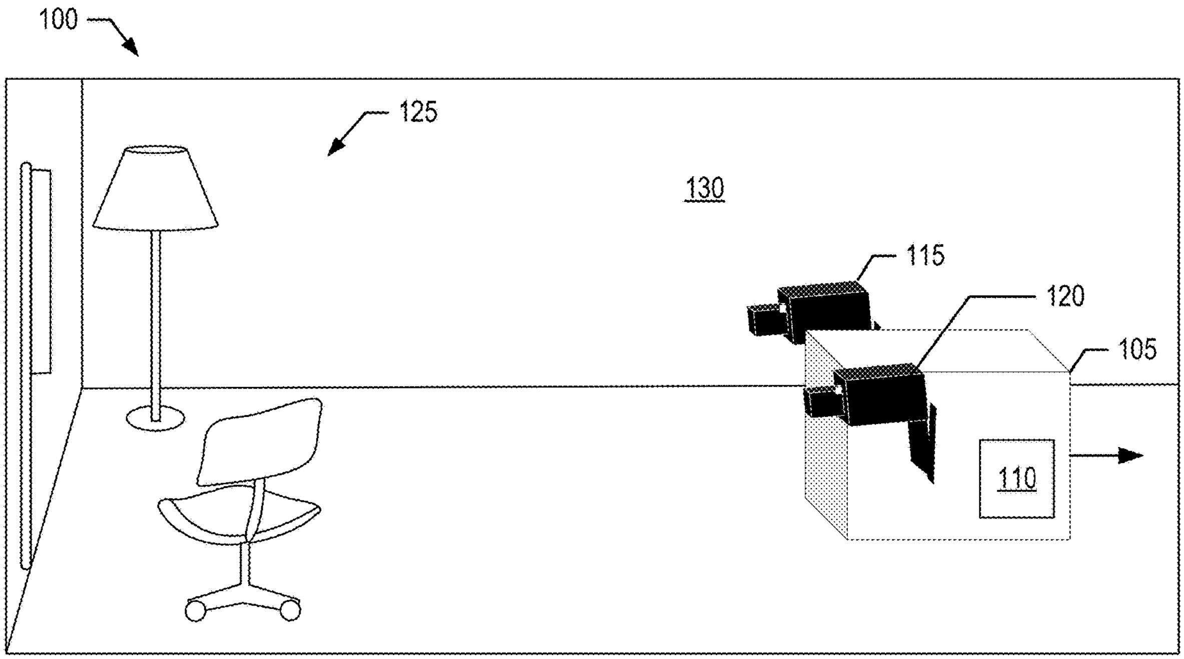
FIGS. 1A-1B illustrate an example environment of use in which an example video processor includes example optical map refinement circuitry to generate optical flow maps based on foreground and background image segmentation in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Example methods, apparatus, systems and articles of manufacture (e.g., physical storage media) to generate optical flow maps based on foreground and background image segmentation are disclosed herein. Optical flow maps are used in many video application to interpolate between a stereo pair of images corresponding to a frame of input stereo video data. Stereo video data includes a sequence of image frames, with each image frame including a pair of stereo images. In some examples, the pair of stereo images includes a first image corresponding to a first camera field-of-view and a second image corresponding to a second camera field-of-view. An optical flow map can be used by a video application to interpolate between the two images of the stereo image pair to generate a third image corresponding to a virtual camera field-of-view between the first camera and the second camera.

Example optical flow map generation techniques disclosed herein refine the optical flow maps determined for a stereo pair of images. Accurate optical flow maps are important as they enable high quality view interpolation results to be achieved. For example, prior optical map generation techniques face difficulties dealing with depth discontinuities, which can result in artifacts in view interpolation results.

Unlike such prior techniques, example optical flow map generation techniques disclosed herein refine, or enhance, the optical flow maps between a stereo pair of images using foreground and background segmentation results. Such refinements are better able to deal with depth discontinuities between the foreground and background segments of the stereo pair of images, thereby reducing or eliminating artifacts in the view interpolation results. In some disclosed examples, a deep learning-based approach is used to estimate alpha mattes for the captured input images in an input stereo image pair using a single background stereo image pair for the scene of interest as a reference. The generated alpha mattes include elements that represent the contributions of the individual pixels of the input images to the foreground versus background image segments. Then, using the generated alpha mattes as a guide, disclosed example optical flow map generation techniques combine, or merge, initial optical flow maps generated for the captured input images in the input stereo image pair with reference optical flow maps generated for the background stereo image pair to generate output optical flow maps for the captured input images in the input stereo image pair. The resulting output optical flow maps enable generation of higher quality view interpolation results than the initial optical flow maps generated for the input images in the input stereo image pair. Furthermore, disclosed example optical flow map generation techniques are compatible with any existing or future technique for generating the initial optical flow maps and reference optical flow maps, and/or for generating the alpha mattes. Also, it is worth noting that generation of the reference optical flow maps for the background frame can be done just once as a training or initialization procedure, thereby contributing minimal processing overhead.

These and other example methods, apparatus, systems and articles of manufacture (e.g., physical storage media) to implement generate optical flow maps based on foreground and background image segmentation are disclosed in further detail below.

Figure 1B:
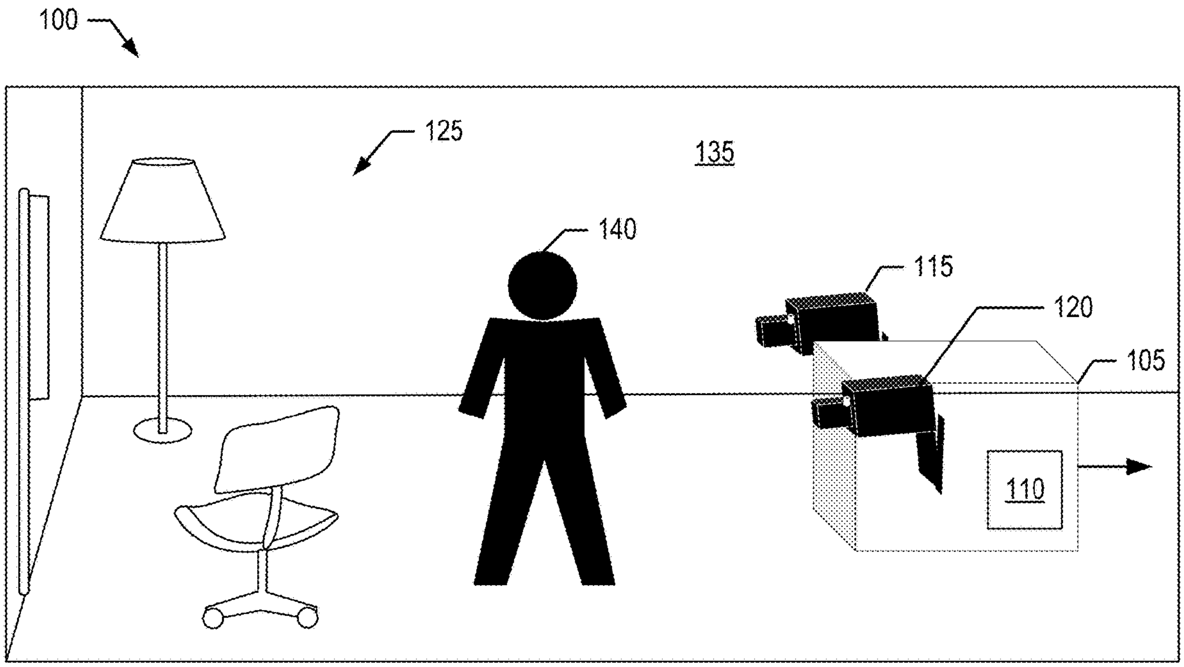

Turning to the figures, FIGS. 1A-1B illustrate an example environment of use 100 in which an example video processor 105 includes example optical map refinement circuitry 110 to generate of optical flow maps based on foreground and background image segmentation in accordance with teachings of this disclosure. The example environment of use 100 illustrated in FIGS. 1A-1B includes a first example camera 115 and a second example camera 120 to capture stereo input video of an example scene 125. In the illustrated example, the input video captured by the first camera 115 is associated with a first field-of-view of the scene 125, and the input video captured by the second camera 120 is associated with a second field-of-view of the scene 125. The first camera 115 is and the second camera 120 can be implemented by any number and/or types of cameras, imaging devices, etc., capable of capturing images associated with visible and/or non-visible light spectra.

The video processor 105 of the illustrated example can be implemented by any number and/or types of video processors, graphic processing units (GPUs), video applications executed by GPUs and/or other programmable circuitry, etc. For example, the video processor 105 may implement/execute one or more computer vision applications involved in analyzing multi-view images, performing three-dimensional (3D) scene perception, implementing object tracking algorithms for surveillance systems, etc. Such video processing applications can benefit from accurate generation of optical flow maps by the optical map refinement circuitry 110 in accordance with the teachings of this disclosure. As another example, the video processor 105 may implement/execute one or more video applications to generate immersive virtual reality (VR) or augmented reality (AR) content using 360-degree Camera arrays including the first camera 115 is and the second camera 120. In such examples, the optical flow maps generated by the optical map refinement circuitry 110 can be used to interpolate between the available camera field-of-views to enhance the user's immersive experience.

In the illustrated example of FIGS. 1A-1B, the optical map refinement circuitry 110 implements an example training (or reference) phase 130, which is illustrated by FIG. 1A, and an example operational phase 135, which is illustrated by FIG. 1B, to generate optical flow maps based on foreground and background image segmentation in accordance with teachings of this disclosure. As shown by FIG. 1A, during the example training phase 130, the optical map refinement circuitry 110 causes the video processor 105 to capture a stereo pair of background images corresponding to the first field-of-view associated with the first camera 115 and the second field-of-view associated with the second camera 120. The stereo pair of background images is representative of the background of the scene 125 before the addition of the foreground content (e.g., objects) of interest. As disclosed in further detail below, during the training phase 130, the optical map refinement circuitry 110 generates reference optical flow maps for the scene 125 based on the stereo pair of background images. For example, the optical map refinement circuitry 110 generates a first reference optical flow map representative of the displacement of pixels from the first field-of-view to the second field-of-view in the stereo pair of background images, and a second reference optical flow map representative of the displacement of pixels from the second field-of-view to the first field-of-view in the stereo pair of background images.

After completion of the training phase 130, the optical map refinement circuitry 110 enters the operational phase 135 and causes the video processor 105 to capture input stereo video which includes stereo pairs of input images corresponding to the first field-of-view associated with the first camera 115 and the second field-of-view associated with the second camera 120. Each stereo pair of input images is representative of the scene 125 after the addition of the foreground content (e.g., objects) of interest, such as the example foreground object 140 (e.g., a person) illustrated in FIG. 1B. As disclosed in further detail below, during the operational phase 135, the optical map refinement circuitry 110 generates output optical flow maps for the scene 125 for successive stereo pairs of input images of the input stereo video. For example, for a given stereo pair of input images, the optical map refinement circuitry 110 generates a first output optical flow map representative of the displacement of pixels from the first field-of-view to the second field-of-view in the stereo pair of input images, and a second reference optical flow map representative of the displacement of pixels from the second field-of-view to the first field-of-view in the stereo pair of input images. As further disclosed below, in some examples, the optical map refinement circuitry 110 generates output optical flow maps for a given stereo pair of input images based on (i) initial optical flow maps generated for the given stereo pair of input images, (ii) the reference optical flow maps previously generated based on the stereo pair of background images, and (iii) alpha mattes generated for the stereo pair of input images. As disclosed in further detail below, the optical map refinement circuitry 110 generates a respective alpha matte for a respective input image of the given stereo pair of input images such that the alpha matte is representative of the segmentation of that input image into foreground and background regions.

In the illustrated example of FIGS. 1A-1B, the optical map refinement circuitry 110 can output the output optical flow maps generate for given stereo pairs of input images along with the stereo video stream output from the video processor 105. In some such examples, the output optical flow maps can be used by a target application in any appropriate manner (e.g., to interpolate between the first and second fields-of-view of the stereo video stream).

Figure 2:
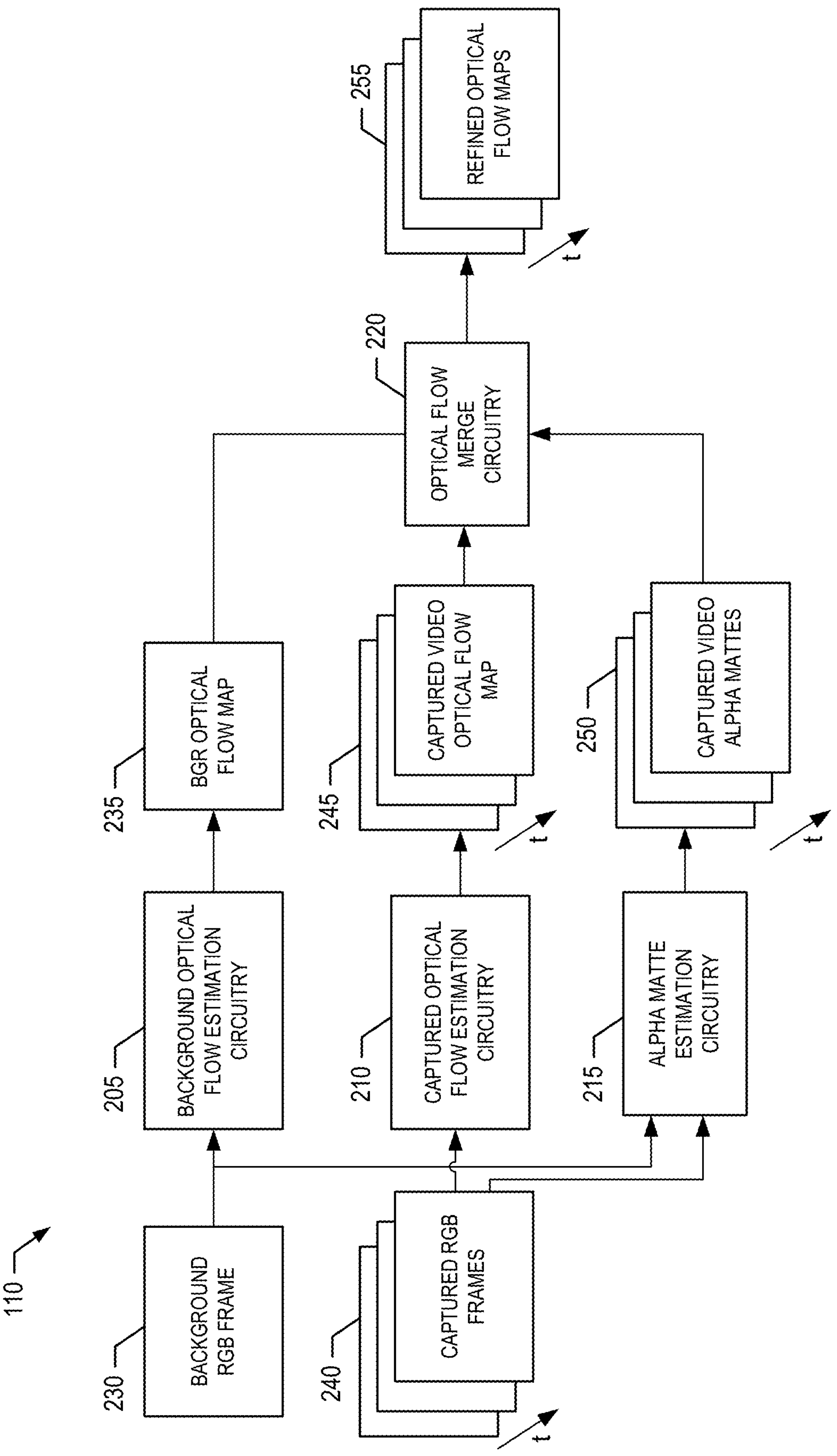
FIG. 2 is a block diagram of an example implementation of the optical map refinement circuitry of FIGS. 1A-1B.

A block diagram of an example implementation of the optical map refinement circuitry 110 of FIGS. 1A-1B is illustrated in FIG. 2. The optical map refinement circuitry 110 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the optical map refinement circuitry 110 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example optical map refinement circuitry 110 of FIG. 2 includes example background optical flow estimation circuitry 205, example captured optical flow estimation circuitry 210, example alpha matte estimation circuitry 215 and example optical flow merge circuitry 220. In the illustrated example, the background optical flow estimation circuitry 205 causes the optical map refinement circuitry 110 to operate in the training phase 130 described above. As described above, during the training phase 130, the background optical flow estimation circuitry 205 accesses an example stereo pair of background images 230 that are representative of a first camera field-of-view and a second camera field-of-view of a background of a scene (e.g., the scene 125) before the addition of the foreground content (e.g., objects) of interest. For example, the example stereo pair of background images 230 can include a first background image containing a first array of pixels captured from the first camera field-of-view and a second background image containing a second array of pixels captured from the second camera field-of-view. The pixels can have values from a red-green-blue (RGB) color space, a luminance and chrominance (e.g., YUV) color space, etc., and can conform with any appropriate image resolution.

The background optical flow estimation circuitry 205 of the illustrated example then generates example reference optical flow maps 235 (also referred to as background optical flow maps 235) for the scene based on the stereo pair of background images 230. For example, assuming the stereo pair of background images 230 includes the first background image corresponding to the first camera field-of-view and the second background image corresponding to the second camera field-of-view, the background optical flow estimation circuitry 205 generates a first reference optical flow map 235 associated with the first background image and a second reference optical flow map 235 associated with the second background image. In such an example, the first reference optical flow map 235 includes an array of elements corresponding respectively to the pixels of the first background image such that the array of elements includes respective displacement vectors to map ones of the pixels of the first background image (which is associated with the first field-of-view) to corresponding ones of the pixels of the second background image (which is associated with the second field-of-view) of the stereo pair of background images 230. Likewise, the second reference optical flow map 235 includes an array of elements corresponding respectively to the pixels of the second background image such that the array of elements includes respective displacement vectors to map ones of the pixels of the second background image (which is associated with the second field-of-view) to corresponding ones of the pixels of the first background image (which is associated with the first field-of-view) of the stereo pair of background images 230. In some examples, the displacement vectors are data tuples containing magnitude and direction values to map a pixel from one of the background images to the other one of the background images in the stereo background image pair 230. The background optical flow estimation circuitry 205 can use any number and/or types of algorithms to generate optical flow maps from a stereo pair of background images. For example, the background optical flow estimation circuitry 205 can implement optical flow map generation using the PixFlow algorithm included in the Surround 360 System by Facebook®. However, the background optical flow estimation circuitry 205 is not limited to that algorithm but, rather, can implement any existing or future optical flow estimation algorithm to generate the reference optical flow maps 235 from the stereo pair of background images 230.

In the illustrated example, the captured optical flow estimation circuitry 210 causes the optical map refinement circuitry 110 to operate in the operational phase 135 described above. As described above, during the operational phase 135, the captured optical flow estimation circuitry 210 accesses example stereo pairs of input images 240 (e.g., a sequence of stereo pairs of input images 240 corresponding to frames of an input stereo video) that are representative of a first camera field-of-view and a second camera field-of-view of a scene (e.g., the scene 125) after the addition of the foreground content (e.g., objects) of interest. For example, a given stereo pair of input images 240 corresponding to a given frame time of an input stereo video can include a first input image containing a first array of pixels captured from the first camera field-of-view and a second input image containing a second array of pixels captured from the second camera field-of-view. The pixels can have values from an RGB color space, a YUV) color space, etc., and can conform with any appropriate image resolution.

The captured optical flow estimation circuitry 210 of the illustrated example then generates example input optical flow maps 245 (also referred to as initial optical flow maps 245) for the scene based on the given stereo pair of input images 240. For example, assuming the stereo pair of input images 240 includes the first input image corresponding to the first camera field-of-view and the second input image corresponding to the second camera field-of-view, the captured optical flow estimation circuitry 210 generates a first input optical flow map 245 associated with the first input image and a second input optical flow map 245 associated with the second input image. In such an example, the first input optical flow map 245 includes an array of elements corresponding respectively to the pixels of the first input image such that the array of elements includes respective displacement vectors to map ones of the pixels of the first input image (which is associated with the first field-of-view) to corresponding ones of the pixels of the second input image (which is associated with the second field-of-view) of the stereo pair of input images 240. Likewise, the second input optical flow map 245 includes an array of elements corresponding respectively to the pixels of the second input image such that the array of elements includes respective displacement vectors to map ones of the pixels of the second input image (which is associated with the second field-of-view) to corresponding ones of the pixels of the first input image (which is associated with the first field-of-view) of the stereo pair of input images 240. In some examples, the displacement vectors are data tuples containing magnitude and direction values to map a pixel from one of the input images to the other one of the input images in the stereo input image pair 240. The captured optical flow estimation circuitry 210 can use any number and/or types of algorithms to generate optical flow maps from a stereo pair of input images. For example, the captured optical flow estimation circuitry 210 can implement optical flow map generation using the PixFlow algorithm included in the Surround 360 System by Facebook®. However, the captured optical flow estimation circuitry 210 is not limited to that algorithm but, rather, can implement any existing or future optical flow estimation algorithm to generate the input optical flow maps 245 from the stereo pair of input images 240. Also, the captured optical flow estimation circuitry 210 can implement the same optical flow estimation algorithm or a different optical flow estimation algorithm than the background optical flow estimation circuitry 205.

In the illustrated example, the alpha matte estimation circuitry 215 is active in the operational phase 135 to generate example alpha mattes 250 for the accessed stereo pairs of input images 240 in the sequence of stereo input image pairs corresponding to frames of an input stereo video. The alpha mattes 250 represent the segmentation of the stereo pairs of input images 240 into foreground and background regions. For example, for a given accessed stereo pair of input images 240 that includes a first input image corresponding to the first camera field-of-view and a second input image corresponding to the second camera field-of-view, the alpha matte estimation circuitry 215 generates a first alpha matte associated with the first input image corresponding to the first camera field-of-view and a second alpha matte associated with the second input image corresponding to the second camera field-of-view. In some examples, the first alpha matte includes an array of elements corresponding respectively to the pixels of the first input image such that the array of elements includes respective alpha values, or weights, that represent how much the different pixels of the first input image (which is associated with the first field-of-view) contribute to the foreground or the background of the first input image. Likewise, the second alpha matte includes an array of elements corresponding respectively to the pixels of the second input image such that the array of elements includes respective alpha values, or weights, that represent how much the different pixels of the second input image (which is associated with the second field-of-view) contribute to the foreground or the background of the second input image. In some examples, the alpha values, or weights, of a given alpha matte are values in the range of 0 to 1, with a value of 1 corresponding to the foreground region of the image and a value of 0 corresponding to the background region of the image. In such examples, larger alpha values, or weights, represent that a corresponding pixel contributes more heavily to, or is more likely to correspond to, the foreground region of the image, whereas smaller alpha values, or weights, represent that a corresponding pixel contributes more heavily to, or is more likely to correspond to, the background region of the image.

In the illustrated example of FIG. 2, the alpha matte estimation circuitry 215 implements an example image segmentation algorithm that utilizes the stereo background image pair 230 as a guide to segmenting a given stereo input image pair 240. In some examples, the alpha matte estimation circuitry 215 uses the first background image of the stereo background image pair 230 (which is associated with the first field-of-view) as guide for segmenting the different pixels of the first input image (which is associated with the first field-of-view) of the stereo input image pair 240 into the foreground or the background regions of the first input image and determining the alpha values, or weight, of the first alpha matte to represent that segmentations. Likewise, in some examples, the alpha matte estimation circuitry 215 uses the second background image of the stereo background image pair 230 (which is associated with the second field-of-view) as guide for segmenting the different pixels of the second input image (which is associated with the second field-of-view) the stereo input image pair 240 into the foreground or the background regions of the second input image and determining the alpha values, or weight, of the second alpha matte to represent that segmentations. For example, the alpha matte estimation circuitry 215 can implement the deep learning based image segmentation algorithm described in Shanchuan et al., "Real-time high-resolution background matting," Proceedings of the IEEE/CVF Conference on Computer Vision and Pattern Recognition, 2021. However, the alpha matte estimation circuitry 215 is not limited to that algorithm but, rather, can implement any existing or future image segmentation algorithm to generate the alpha mattes 250 for the stereo input image pair 240 (e.g., using the stereo background image pair 230 as a guide).

In the illustrated example, the optical flow merge circuitry 220 is active in the operational phase 135 to combine, or merge, the input (or initial) optical flow maps 245 for a given stereo input image pair 240 with the background optical flow maps 235 for the stereo background image pair 230 to generate example output optical flow maps 255 for the given stereo input image pair 240. In the illustrated example, the optical flow merge circuitry 220 performs such optical flow map combining using the alpha mattes 250 for the given stereo input image pair 240 as a guide. In some examples, the optical flow merge circuitry 220 combines the input (or initial) optical flow maps 245 with the background optical flow maps 235 elementwise using the alpha mattes 250 as a guide. For example, for a given stereo input image pair 240, the optical flow merge circuitry 220 can combine elements of the first background optical flow map 235 associated with the first camera field-of-view with the corresponding elements of the first input optical flow map 245 corresponding to the first input image of the stereo input image pair 240 (which corresponds to the first field-of-view) based on the corresponding elements of the first alpha matte 250 corresponding to the first input image of the stereo input image pair 240 (which corresponds to the first field-of-view). Likewise, for the given stereo input image pair 240, the optical flow merge circuitry 220 can combine elements of the second background optical flow map 235 associated with the second camera field-of-view with the corresponding elements of the second input optical flow map 245 corresponding to the second input image of the stereo input image pair 240 (which corresponds to the second field-of-view) based on the corresponding elements of the second alpha matte 250 corresponding to the second input image of the stereo input image pair 240 (which corresponds to the second field-of-view).

In some examples, the optical flow merge circuitry 220 performs optical flow map combining based on Equation 1, which is:

$$OF_{refine} = (1 - w) \times OF_{bgr} + w \times OF_{fgr} \qquad \text{Equation 1}$$

$$\text{where } w = 0 \leq \text{alpha} \leq 1$$

In Equation 1, $OF_{refine}$ refers to the output (or refined) optical flow maps 255, $OF_{bgr}$ refers to the reference optical flow maps 235 associated with the background frame, $OF_{fgr}$ refers to the optical flow maps 245 of associated with the given input image frame, and alpha refers to the alpha mattes 250 for the given input image frame. Thus, to generate an output optical flow map 255 for a given image of a given stereo input image frame 240 based on Equation 1, the optical flow merge circuitry 220 multiplies values of the elements of the reference optical flow map 235 for that image field-of-view (e.g., $OF_{bgr}$ in Equation 1) by the values of the corresponding elements of the alpha matte 250 for that image field-of-view (e.g., w=alpha in Equation 1) subtracted from one (e.g., (1−w) in Equation 1) to determine respective first quantities (e.g., $(1-w)\times OF_{bgr}$ in Equation 1). The optical flow merge circuitry 220 also multiplies values of the corresponding elements of the input optical flow map 245 for that image field-of-view (e.g., $OF_{fgr}$ in Equation 1) with the values of the corresponding elements of the alpha matte 250 for that image field-of-view (e.g., w=alpha in Equation 1) to determine respective second quantities (e.g., $w\times OF_{fgr}$ in Equation 1). The optical flow merge circuitry 220 further adds the first quantities (e.g., $(1-w)\times OF_{bgr}$ in Equation 1) and the second quantities (e.g., $w\times OF_{fgr}$ in Equation 1) to determine the values of the corresponding elements included in the output optical flow map 255 for that image field-of-view (e.g., $OF_{refine}=(1-w)\times OF_{bgr}+w\times OF_{fgr}$ of Equation 1).

In the illustrated example, the optical flow merge circuitry 220 outputs the generated, output optical flow maps 255 to a video processor, a video application, etc., such as the video processor 105 of FIGS. 1A-1B. In examples in which the optical map refinement circuitry 110 is included in (e.g., implemented by) the video processor 105, such as in the example of FIGS. 1A-1B, the optical flow merge circuitry 220 may write the output optical flow maps 255 to memory and/or one or more registers of the video processor 105. In examples in which the optical map refinement circuitry 110 is remote from the video processor or video application, the optical flow merge circuitry 220 may transmit the output optical flow maps 255 to the video processor or video application via one or more networks.

The example optical map refinement circuitry 110 of FIGS. 1A-1B and FIG. 2 has been described from the perspective of generating output optical flow maps 255 for stereo input image pairs 240 of an input stereo video stream. However, the optical map refinement circuitry 110 is not limited thereto. On the contrary, the optical map refinement circuitry 110 can generate output optical flow maps 255 for input video streams supporting any number of camera views. In some such examples, the optical map refinement circuitry 110 examines each pair of input image pairs corresponding to each possible pair of different camera field-of-views in the and input video stream and generates output optical flow maps 255 for that image pair. Thus, if an example input video stream supports N different camera views, the optical map refinement circuitry 110 can compute up to N(N−1)/2 pairs of output optical flow maps 255 for a given input image frame, which corresponds to the N(N−1)/2 different possible pairs of available camera fields-of-view.

In some examples, the optical map refinement circuitry 110 includes means for generating reference optical flow maps. For example, the means for generating reference optical flow maps may be implemented by the background optical flow estimation circuitry 205. In some examples, the background optical flow estimation circuitry 205 may be instantiated by programmable circuitry such as the example programmable circuitry 512 of FIG. 5. In some examples, the background optical flow estimation circuitry 205 is instantiated by programmable circuitry executing background optical flow estimation instructions and/or configured to perform operations such as those represented by the blocks 305 and 310 of the flowchart of FIG. 3. For example, the background optical flow estimation circuitry 205 may be instantiated by the example microprocessor 600 of FIG. 6 executing machine executable instructions such as those implemented by at least blocks 305 and 310 of FIG. 3. In some examples, the background optical flow estimation circuitry 205 may be instantiated by hardware logic circuitry, which may be implemented by an ASIC, XPU, or the FPGA circuitry 700 of FIG. 7 structured to perform operations corresponding to the machine readable instructions. Additionally or alternatively, the background optical flow estimation circuitry 205 may be instantiated by any other combination of hardware, software, and/or firmware. For example, the background optical flow estimation circuitry 205 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the optical map refinement circuitry 110 includes means for generating input, or initial, optical flow maps. For example, the means for generating input optical flow maps may be implemented by the captured optical flow estimation circuitry 210. In some examples, the captured optical flow estimation circuitry 210 may be instantiated by programmable circuitry such as the example programmable circuitry 512 of FIG. 5. In some examples, the captured optical flow estimation circuitry 210 is instantiated by programmable circuitry executing input optical flow estimation instructions and/or configured to perform operations such as those represented by the blocks 320 and 325 of the flowchart of FIG. 3. For example, the captured optical flow estimation circuitry 210 may be instantiated by the example microprocessor 600 of FIG. 6 executing machine executable instructions such as those implemented by at least blocks 320 and 325 of FIG. 3. In some examples, the captured optical flow estimation circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the captured optical flow estimation circuitry 210 may be instantiated by any other combination of hardware, software, and/or firmware. For example, captured optical flow estimation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the optical map refinement circuitry 110 includes means for generating alpha mattes. For example, the means for generating alpha mattes may be implemented by the alpha matte estimation circuitry 215. In some examples, the alpha matte estimation circuitry 215 may be instantiated by programmable circuitry such as the example programmable circuitry 512 of FIG. 5. In some examples, the alpha matte estimation circuitry 215 is instantiated by programmable circuitry executing alpha matte estimation instructions and/or configured to perform operations such as those represented by the block 330 of the flowchart of FIG. 3. For example, the alpha matte estimation circuitry 215 may be instantiated by the example microprocessor 600 of FIG. 6 executing machine executable instructions such as those implemented by at least block 330 of FIG. 3. In some examples, the alpha matte estimation circuitry 215 may be instantiated by hardware logic circuitry, which may be implemented by an ASIC, XPU, or the FPGA circuitry 700 of FIG. 7 structured to perform operations corresponding to the machine readable instructions. Additionally or alternatively, the alpha matte estimation circuitry 215 may be instantiated by any other combination of hardware, software, and/or firmware. For example, the alpha matte estimation circuitry 215 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the optical map refinement circuitry 110 includes means for merging optical flow maps. For example, the means for merging optical flow maps may be implemented by the optical flow merge circuitry 220. In some examples, the optical flow merge circuitry 220 may be instantiated by programmable circuitry such as the example programmable circuitry 512 of FIG. 5. In some examples, the optical flow merge circuitry 220 is instantiated by programmable circuitry executing background optical flow estimation instructions and/or configured to perform operations such as those represented by the blocks 335 and 345 of the flowchart of FIG. 3 and/or blocks 405-435 of the flowchart of FIG. 4. For example, the optical flow merge circuitry 220 may be instantiated by the example microprocessor 600 of FIG. 6 executing machine executable instructions such as those implemented by at least blocks 335 and 345 of the flowchart of FIG. 3 and/or blocks 405-435 of the flowchart of FIG. 4. In some examples, the optical flow merge circuitry 220 may be instantiated by hardware logic circuitry, which may be implemented by an ASIC. XPU, or the FPGA circuitry 700 of FIG. 7 structured to perform operations corresponding to the machine readable instructions. Additionally or alternatively, the optical flow merge circuitry 220 may be instantiated by any other combination of hardware, software, and/or firmware. For example, the optical flow merge circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the optical map refinement circuitry 110 is illustrated in FIGS. 1A-1B and 2, one or more of the elements, processes, and/or devices illustrated in FIGS. 1A-1B and 2 may be combined, divided, re-arranged, omitted, eliminated, and/or implemented in any other way. Further, the example background optical flow estimation circuitry 205, the example captured optical flow estimation circuitry 210, the example alpha matte estimation circuitry 215, the example optical flow merge circuitry 220 and/or, more generally, the example optical map refinement circuitry 110 of FIGS. 1A-1B and 2 may be implemented by hardware alone or by hardware in combination with software and/or firmware. Thus, for example, any of the example background optical flow estimation circuitry 205, the example captured optical flow estimation circuitry 210, the example alpha matte estimation circuitry 215, the example optical flow merge circuitry 220 and/or, more generally, the example optical map refinement circuitry 110 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example optical map refinement circuitry 110 may include one or more elements, processes, and/or devices in addition to, or instead of, those illustrated in FIGS. 1A-1B and 2, and/or may include more than one of any or all of the illustrated elements, processes and devices.

Figure 3:
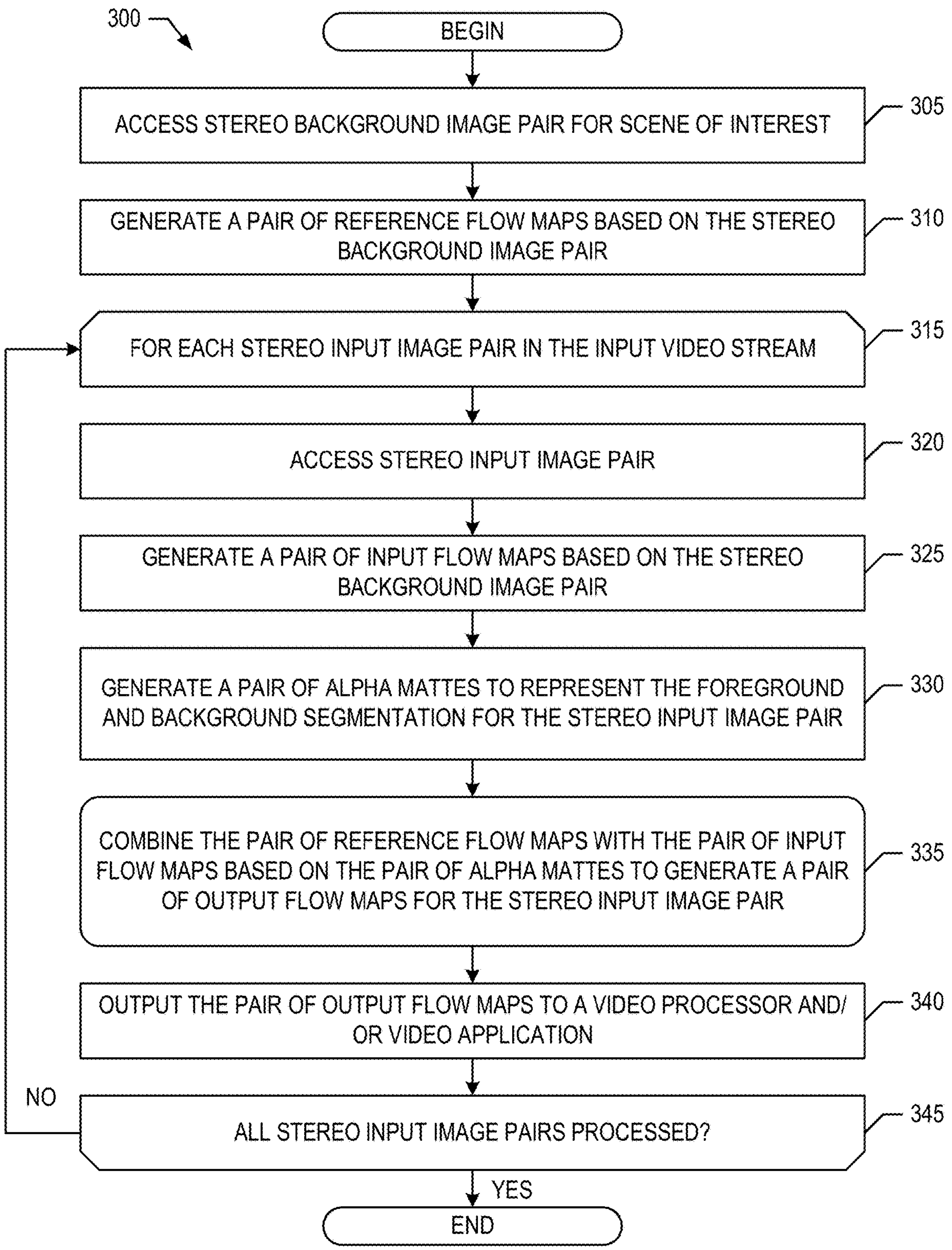
FIGS. 3-4 are flowcharts representative of example machine readable instructions and/or example operations that may be executed, instantiated, and/or performed by example programmable circuitry to implement the optical map refinement circuitry of FIGS. 1A-1B and/or 2.

Flowchart(s) representative of example machine readable instructions, which may be executed by programmable circuitry to implement and/or instantiate the optical map refinement circuitry 110 of FIGS. 1A-1B and/or 2 and/or representative of example operations which may be performed by programmable circuitry to implement and/or instantiate the optical map refinement circuitry 110 of FIGS. 1A-1B and/or 2, are shown in FIGS. 3 and/or 4. The machine readable instructions may be one or more executable programs or portion(s) of one or more executable programs for execution by programmable circuitry such as the processor circuitry 512 shown in the example processor platform 500 discussed below in connection with FIG. 5 and/or may be one or more function(s) or portion(s) of functions to be performed by the example programmable circuitry (e.g., an FPGA) discussed below in connection with FIGS. 6 and/or 7. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 3 and/or 4, many other methods of implementing the example optical map refinement circuitry 110 may alternatively be used. For example, the order of execution of the blocks of the flowchart(s) may be changed, and/or some of the blocks described may be changed, eliminated, or combined. Additionally or alternatively, any or all of the blocks of the flowchart(s) may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and/or 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C. or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A. (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to generate optical flow maps based on foreground and background image segmentation in accordance with teachings of this disclosure. With reference to the preceding figures and associated written descriptions, the machine readable instructions and/or the operations 300 of FIG. 3 begin at block 305, at which the optical map refinement circuitry 110 enters the training phase 130 and the background optical flow estimation circuitry 205 of the optical map refinement circuitry 110 accesses, as described above, the stereo pair of background images 230 that are representative of a first camera field-of-view and a second camera field-of-view of a background of a scene of interest, such as the scene 125. At block 310, the background optical flow estimation circuitry 205 generates, as described above, the reference optical flow maps 235 (also referred to as background optical flow maps 235) for the scene based on the stereo pair of background images 230 accessed at block 305.

At block 315, the optical map refinement circuitry 110 enters the operational phase 135 and begins processing each stereo pair of input images 240 corresponding to frames of the input stereo video. At block 320, the captured optical flow estimation circuitry 210 of the optical map refinement circuitry 110 accesses, as described above, a given stereo pair of input images 240 corresponding to a given frame time of the input stereo video. At block 325, the captured optical flow estimation circuitry 210 generates, as described above, the input (or initial) optical flow maps 245 for the stereo input image pair 240 accessed at block 320. At block 330, the alpha matte estimation circuitry 215 of the optical map refinement circuitry 110 generates, as described above, the alpha mattes 250 for the stereo input image pair 240 accessed at block 320 using the stereo background image pair 230 accessed at block 305.

At block 335, the optical flow merge circuitry 220 of the optical map refinement circuitry 110 combines, or merges, the input (or initial) optical flow maps 245 for the given stereo input image pair 240 with the background optical flow maps 235 for the stereo background image pair 230 based on the alpha mattes 250 to generate the output (or refined) optical flow maps 255 for the given stereo input image pair 240, as described above. Example machine readable instructions and/or example operations that may be executed and/or instantiated by processor circuitry to implement the processing at block 335 are illustrated in FIG. 4, which is described in detail below.

At block 340, the optical flow merge circuitry 220 outputs, as described above, the generated output (or refined) optical flow maps 255 for the given stereo input image pair 240 to a video processor and/or video application, such as the video processor 105. At block 345, the optical map refinement circuitry 110 continues processing successive stereo input image pairs 240 of the input stereo video according to blocks 320-340, as described above. When optical flow map generation for the stereo input image pairs 240 of the input stereo video is finished, the machine readable instructions and/or the operations 300 of FIG. 3 end.

Figure 4:
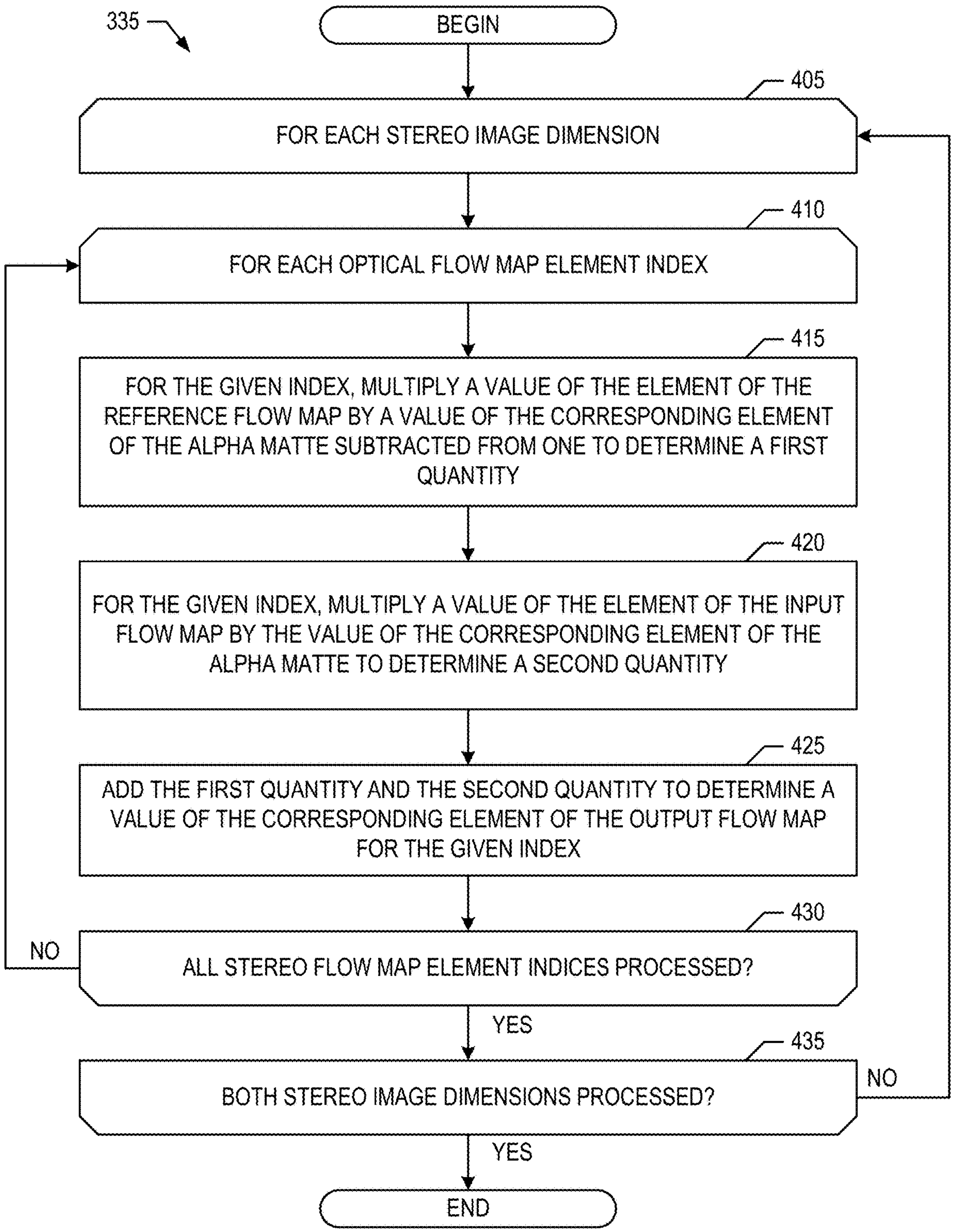

FIG. 4 is a flowchart representative of example machine readable instructions and/or example operations 335 that may be executed and/or instantiated by processor circuitry to implement the processing at block 335 of FIG. 3 to combine/merge input and reference optical flow maps based on alpha mattes in accordance with teachings of this disclosure. With reference to the preceding figures and associated written descriptions, the machine readable instructions and/or the operations 335 of FIG. 4 begin at block 405, at which the optical flow merge circuitry 220 of the optical map refinement circuitry 110 iterates over each camera field-of-view (also referred to as each stereo image dimensions). At block 410, the optical flow merge circuitry 220 iterates over the elements of the output optical flow map 255 to be generated for the given camera field-of-view (or the given stereo image dimension). For example, an optical flow map includes an array of elements, as described above, which correspond to the pixels of its source image, and an index can be used to select elements at different positions of the optical flow map. At block 415, for a given index value, the optical flow merge circuitry 220 multiplies a value of the corresponding element of the reference optical flow map 235 for the selected image field-of-view (e.g., $OF_{bgr}$ in Equation 1) by the value of the corresponding element of the alpha matte 250 for the given image field-of-view (e.g., w=alpha in Equation 1) subtracted from one (e.g., (1−w) in Equation 1) to determine a first quantity (e.g., $(1-w)\times OF_{bgr}$ in Equation 1), as described above. At block 415, for the given index value, the optical flow merge circuitry 220 multiplies a value of the corresponding element of the input optical flow map 245 for the given image field-of-view (e.g., $OF_{fgr}$ in Equation 1) with the value of the corresponding element of the alpha matte 250 for the given image field-of-view (e.g., w=alpha in Equation 1) to determine a second quantity (e.g., $w\times OF_{fgr}$ in Equation 1), as described above. At block 425, the optical flow merge circuitry 220 adds the first quantity (e.g., $(1-w)\times O_{bgr}$ in Equation 1) and the second quantity (e.g., $w\times OF_{fgr}$ in Equation 1) to determine a value of the corresponding element included in the output optical flow map 255 for the given image field-of-view (e.g., $OF_{refine}=(1-w)\times OF_{bgr}+w\times OF_{fgr}$ of Equation 1).

At block 430, the optical flow merge circuitry 220 continues iterating over the flow map index until the elements of the output optical flow map 255 have been generated according to blocks 415-425. At block 435, the optical flow merge circuitry 220 continues iterating over the camera fields-of-view (or the stereo image dimensions) until output optical flow maps 255 have been generated for the different camera fields-of-view (or the stereo image dimensions). The machine readable instructions and/or the operations 335 of FIG. 4 the end.

Figure 5:
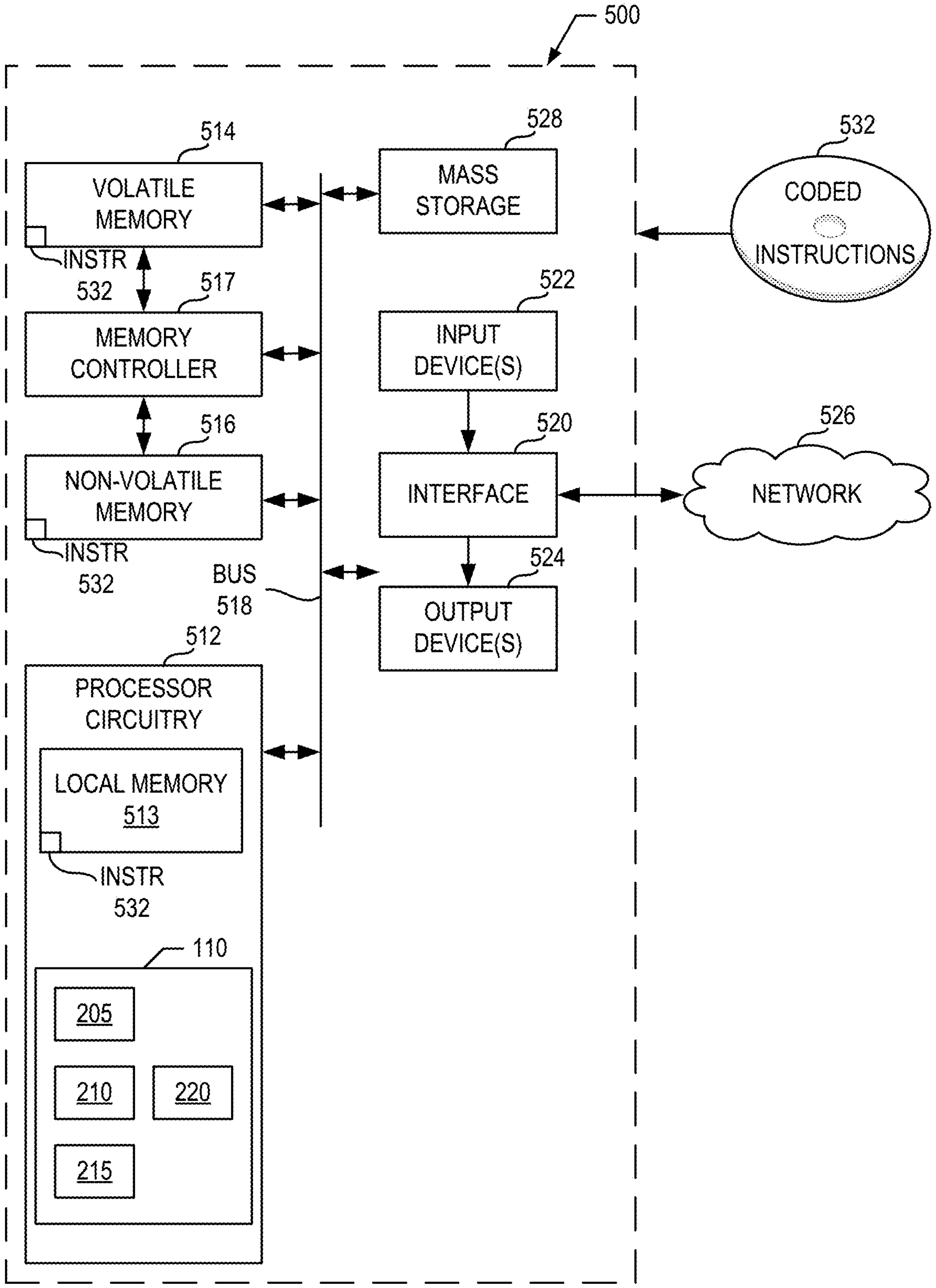
FIG. 5 is a block diagram of an example processing platform including programmable circuitry structured to execute, instantiate, and/or perform the example machine readable instructions and/or the example operations of FIGS. 3 and/or 4 to implement the example optical map refinement circuitry of FIGS. 1A-1B and/or 2.

FIG. 5 is a block diagram of an example programmable circuitry platform 500 structured to execute and/or instantiate the example machine-readable instructions and/or the example operations of FIGS. 3 and/or 4 to implement the optical map refinement circuitry 110 of FIGS. 1A-1B and/or 2. The programmable circuitry platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, and/or microcontrollers from any desired family or manufacturer. The programmable circuitry 512 may be implemented by one or more semiconductor based (e.g., silicon based) devices. In this example, the programmable circuitry 512 implements the example background optical flow estimation circuitry 205, the example captured optical flow estimation circuitry 210, the example alpha matte estimation circuitry 215 and/or the example optical flow merge circuitry 220.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter data and/or commands into the programmable circuitry 512. The input device(s) 522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 500 of the illustrated example also includes one or more mass storage discs or devices 528 to store firmware, software, and/or data. Examples of such mass storage discs or devices 528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 532, which may be implemented by the machine readable instructions of FIGS. 3 and/or 4, may be stored in the mass storage device 528, in the volatile memory 514, in the non-volatile memory 516, and/or on at least one non-transitory computer readable storage medium such as a CD or DVD which may be removable.

Figure 6:
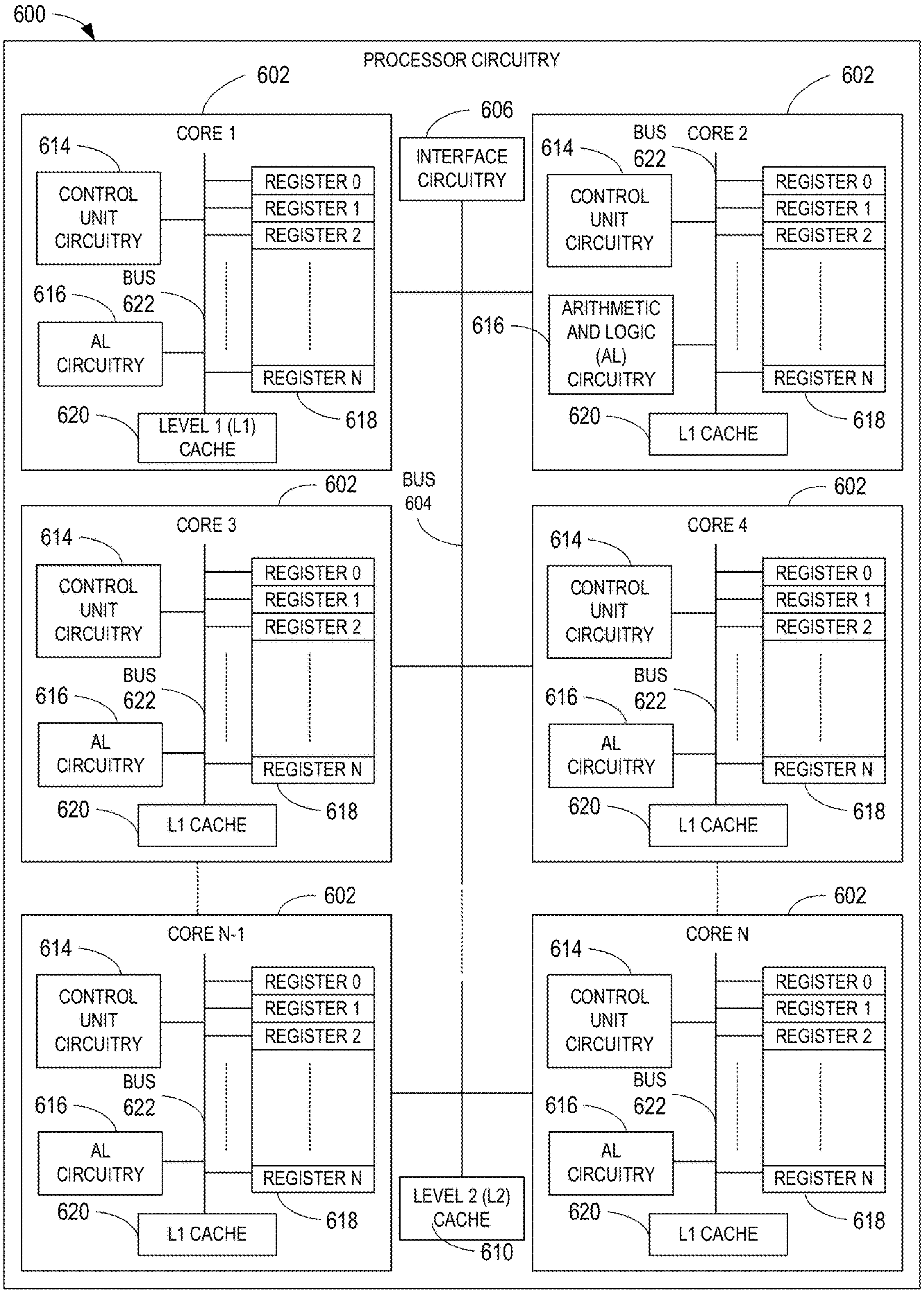
FIG. 6 is a block diagram of an example implementation of the programmable circuitry of FIG. 5.

FIG. 6 is a block diagram of an example implementation of the programmable circuitry 512 of FIG. 5. In this example, the programmable circuitry 512 of FIG. 5 is implemented by a microprocessor 600. For example, the microprocessor 600 may be a general-purpose microprocessor (e.g., general-purpose microprocessor circuitry). The microprocessor 600 executes some or all of the machine-readable instructions of the flowcharts of FIGS. 3 and/or 4 to effectively instantiate the circuitry of FIGS. 1A-1B and/or 2 as logic circuits to perform operations corresponding to those machine readable instructions. In some such examples, the circuitry of FIGS. 1A-1B and/or 2 is instantiated by the hardware circuits of the microprocessor 600 in combination with the machine-readable instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3 and/or 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating-point operations. In yet other examples, the AL circuitry 616 may include first AL circuitry that performs integer-based operations and second AL circuitry that performs floating-point operations. In some examples, the AL circuitry 616 may be referred to as an Arithmetic Logic Unit (ALU).

The registers 618 are semiconductor-based structures to store data and/or instructions such as results of one or more of the operations performed by the AL circuitry 616 of the corresponding core 602. For example, the registers 618 may include vector register(s), SIMD register(s), general-purpose register(s), flag register(s), segment register(s), machine-specific register(s), instruction pointer register(s), control register(s), debug register(s), memory management register (s), machine check register(s), etc. The registers 618 may be arranged in a bank as shown in FIG. 6. Alternatively, the registers 618 may be organized in any other arrangement, format, or structure, such as by being distributed throughout the core 602 to shorten access time. The second bus 622 may be implemented by at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages.

The microprocessor 600 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 600, in the same chip package as the microprocessor 600 and/or in one or more separate packages from the microprocessor 600.

Figure 7:
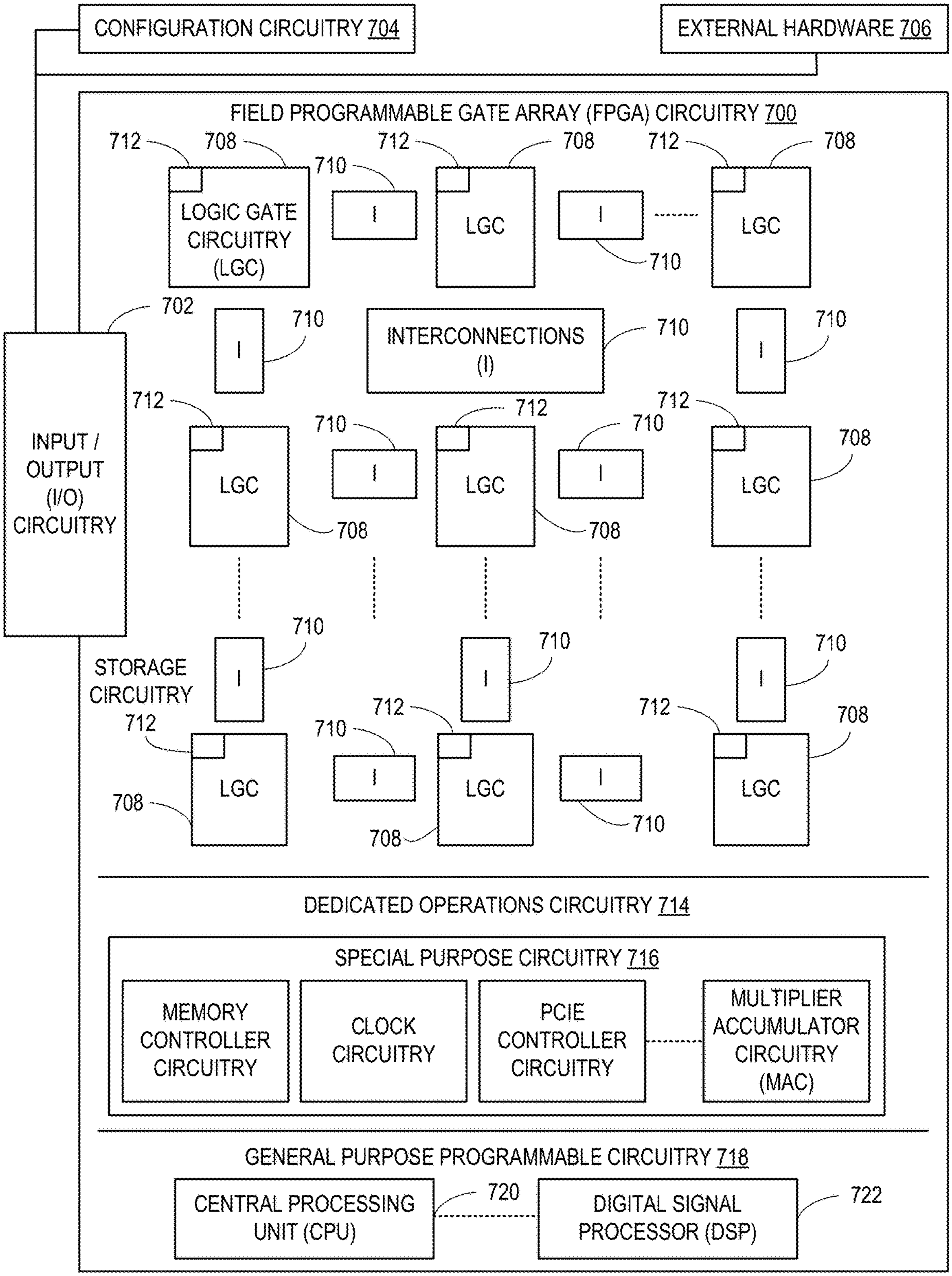
FIG. 7 is a block diagram of another example implementation of the programmable circuitry of FIG. 5.

FIG. 7 is a block diagram of another example implementation of the programmable circuitry 512 of FIG. 5. In this example, the programmable circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 600 of FIG. 6 described above (which is a general purpose device that may be programmed to execute some or all of the machine readable instructions represented by the flowchart (s) of FIGS. 3 and/or 4 but whose interconnections and logic circuitry are fixed once fabricated), the FPGA circuitry 700 of the example of FIG. 7 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 3 and/or 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 3 and/or 4. As such, the FPGA circuitry 700 may be configured and/or structured to effectively instantiate some or all of the operations/functions corresponding to the machine readable instructions of the flowchart(s) of FIGS. 3 and/or 4 as dedicated logic circuits to perform the operations/functions corresponding to those software instructions in a dedicated manner analogous to an ASIC. Therefore, the FPGA circuitry 700 may perform the operations/functions corresponding to the some or all of the machine readable instructions of FIGS. 3 and/or 4 faster than the general-purpose microprocessor can execute the same.

In the example of FIG. 7, the FPGA circuitry 700 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 700 of FIG. 7 may access and/or load the binary file to cause the FPGA circuitry 700 of FIG. 7 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 700 of FIG. 7 to cause configuration and/or structuring of the FPGA circuitry 700 of FIG. 7, or portion(s) thereof.

The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain a binary file, which may be implemented by a bit stream, data, and/or machine-readable instructions, to configure the FPGA circuitry 700, or portion(s) thereof. In some such examples, the configuration circuitry 704 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 706 may be implemented by external hardware circuitry. For example, the external hardware 706 may be implemented by the microprocessor 600 of FIG. 6.

The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations/functions that may correspond to at least some of the machine readable instructions of FIGS. 3 and/or 4 and/or other desired operations. The logic gate circuitry 708 shown in FIG. 7 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations/functions. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example dedicated operations circuitry 714. In this example, the dedicated operations circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the programmable circuitry 512 of FIG. 5, many other approaches are contemplated. For example, FPGA circuitry may include an on-board CPU, such as one or more of the example CPU 720 of FIG. 6. Therefore, the programmable circuitry 512 of FIG. 5 may additionally be implemented by combining at least the example microprocessor 600 of FIG. 6 and the example FPGA circuitry 700 of FIG. 7. In some such hybrid examples, one or more cores 602 of FIG. 6 may execute a first portion of the machine readable instructions represented by the flowchart(s) of FIGS. 3 and/or 4 to perform first operation(s)/function(s), the FPGA circuitry 700 of FIG. 7 may be configured and/or structured to perform second operation(s)/function(s) corresponding to a second portion of the machine readable instructions represented by the flowcharts of FIGS. 3 and/or 4, and/or an ASIC may be configured and/or structured to perform third operation(s)/function(s) corresponding to a third portion of the machine readable instructions represented by the flowcharts of FIGS. 3 and/or 4.

It should be understood that some or all of the circuitry of FIGS. 1A-1B and/or 2 may, thus, be instantiated at the same or different times. For example, same and/or different portion(s) of the microprocessor 600 of FIG. 6 may be programmed to execute portion(s) of machine-readable instructions at the same and/or different times. In some examples, same and/or different portion(s) of the FPGA circuitry 700 of FIG. 7 may be configured and/or structured to perform operations/functions corresponding to portion(s) of machine-readable instructions at the same and/or different times.

In some examples, some or all of the circuitry of FIGS. 1A-1B and/or 2 may be instantiated, for example, in one or more threads executing concurrently and/or in series. For example, the microprocessor 600 of FIG. 6 may execute machine readable instructions in one or more threads executing concurrently and/or in series. In some examples, the FPGA circuitry 700 of FIG. 7 may be configured and/or structured to carry out operations/functions concurrently and/or in series. Moreover, in some examples, some or all of the circuitry of FIGS. 1A-1B and/or 2 may be implemented within one or more virtual machines and/or containers executing on the microprocessor 600 of FIG. 6.

In some examples, the programmable circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the programmable circuitry 512 of FIG. 5, which may be in one or more packages. For example, the XPU may include a CPU (e.g., the microprocessor 600 of FIG. 6, the CPU 720 of FIG. 7, etc.) in one package, a DSP (e.g., the DSP 722 of FIG. 7) in another package, a GPU in yet another package, and an FPGA (e.g., the FPGA circuitry 700 of FIG. 7) in still yet another package.

Figure 8:
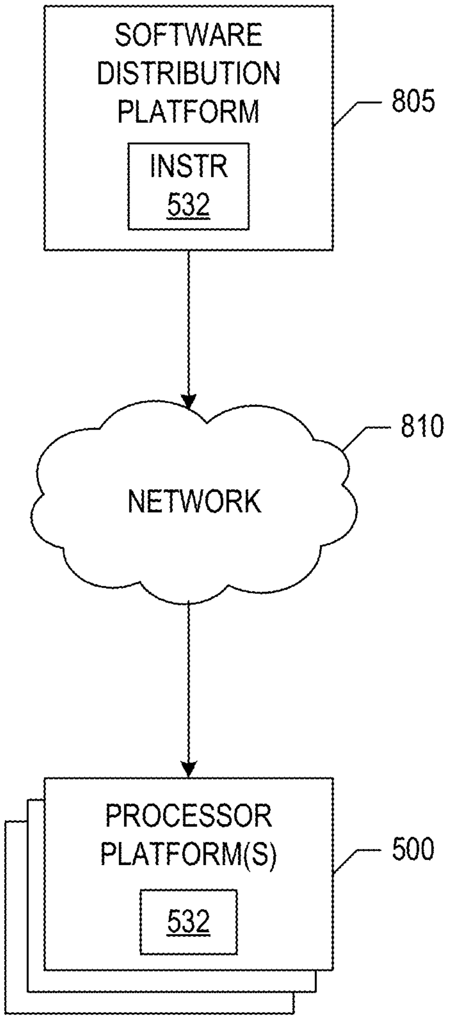
FIG. 8 is a block diagram of an example software/firmware/instructions distribution platform (e.g., one or more servers) to distribute software, instructions, and/or firmware (e.g., corresponding to the example machine readable instructions of FIGS. 3 and/or 4) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to other hardware devices (e.g., hardware devices owned and/or operated by third parties from the owner and/or operator of the software distribution platform) is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions of FIGS. 3 and/or 4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions of FIGS. 3 and/or 4, may be downloaded to the example programmable circuitry platform 500, which is to execute the machine readable instructions 532 to implement the optical map refinement circuitry 110. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices. Although referred to as software above, the distributed "software" could alternatively be firmware.

From the foregoing, it will be appreciated that example systems, methods, apparatus, and articles of manufacture have been disclosed that generate optical flow maps based on foreground and background image segmentation. Disclosed examples provide an optical flow estimation framework that generates refined optical flow maps based on background matting, but that are not dependent on a particular technique for background matting or optical flow estimation. The resulting, refined optical flow maps output from the disclosed examples can produce view interpolation results with fewer artifacts than prior optical flow estimation techniques. Moreover, the additional computation cost for the optical flow map refinement pipeline is minimal while the accuracy of the resulting optical flow map can be a substantial improvement over prior optical flow estimation techniques. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus to generate optical flow maps, the apparatus comprising interface circuitry, machine readable instructions, and programmable circuitry to execute the machine readable instructions to at least generate a reference optical flow map based on a stereo pair of background images corresponding to a first camera field-of-view and a second camera field-of-view, generate a first optical flow map based on a stereo pair of input images corresponding to the first camera field-of-view and the second camera field-of-view, combine the reference optical flow map and the first optical flow map based on an alpha matte to generate a second optical flow map associated with the stereo pair of input images, the alpha matte representative of segmentation of at least one of the stereo pair of input images into foreground and background regions, and output the second optical flow map to at least one of a video processor or a video application.

Example 2 includes the apparatus of example 1, wherein the stereo pair of input images is a first stereo pair of a sequence of stereo pairs of input images, the alpha matte is a first alpha matte, and the programmable circuitry is to generate a third optical flow map based on a second stereo pair of input images in the sequence of stereo pairs of input images, combine the reference optical flow map and the third optical flow map based on a second alpha matte to generate a fourth optical flow map associated with the second stereo pair of input images, the second alpha matte representative of segmentation of at least one of the second stereo pair of input images into foreground and background regions, and output the fourth optical flow map to the at least one of the video processor or the video application.

Example 3 includes the apparatus of example 1 or example 2, wherein the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images, and the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

Example 4 includes the apparatus of example 3, wherein the reference optical flow map is a first reference optical flow map, the alpha matte is a first alpha matte representative of segmentation of the first one of the stereo pair of input images into foreground and background regions, and the programmable circuitry is to generate a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images, generate a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images, combine the second reference optical flow map and the third optical flow map based on a second alpha matte to generate a fourth optical flow map associated with the stereo pair of input images, the second alpha matte representative of segmentation of the second one of the stereo pair of input images into foreground and background regions, and output the fourth optical flow map to the at least one of the video processor or the video application.

Example 5 includes the apparatus of example 3, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and to combine the reference optical flow map and the first optical flow map, the programmable circuitry is to combine one of the elements of the reference optical flow map with a corresponding one of the elements of the first optical flow map based on a corresponding one of the elements of the alpha matte.

Example 6 includes the apparatus of example 5, wherein the corresponding one of the elements of the alpha matte has a value in a range from zero to one, and to combine the one of the elements of the reference optical flow map with the corresponding one of the elements of the first optical flow map, the programmable circuitry is to multiply a value of the one of the elements of the reference optical flow map by the value of the corresponding one of the elements of the alpha matte subtracted from one to determine a first quantity, multiply a value of the corresponding one of the elements of the first optical flow map with the value of the corresponding one of the elements of the alpha matte to determine a second quantity, and add the first quantity and the second quantity to determine a value of a corresponding one of a plurality of elements included in the second optical flow map.

Example 7 includes the apparatus of example 1, wherein to combine the reference optical flow map and the first optical flow map, the programmable circuitry is to combine respective elements of the reference optical flow map with corresponding elements of the first optical flow map based on corresponding elements of the alpha matte to determine corresponding elements of the second optical flow map.

Example 8 includes at least one non-transitory computer readable medium comprising computer readable instructions to cause programmable circuitry to at least generate a reference optical flow map based on a stereo pair of background images corresponding to a first camera field-of-view and a second camera field-of-view, generate a first optical flow map based on a stereo pair of input images corresponding to the first camera field-of-view and the second camera field-of-view, merge the reference optical flow map and the first optical flow map based on an alpha matte to generate a second optical flow map associated with the stereo pair of input images, the alpha matte representative of segmentation of at least one of the stereo pair of input images into foreground and background regions, and output the second optical flow map to at least one of a video processor or a video application.

Example 9 includes the at least one non-transitory computer readable medium of example 8, wherein the stereo pair of input images is a first stereo pair of a sequence of stereo pairs of input images, the alpha matte is a first alpha matte, and the instructions are to cause the programmable circuitry to generate a third optical flow map based on a second stereo pair of input images in the sequence of stereo pairs of input images, merge the reference optical flow map and the third optical flow map based on a second alpha matte to generate a fourth optical flow map associated with the second stereo pair of input images, the second alpha matte representative of segmentation of at least one of the second stereo pair of input images into foreground and background regions, and output the fourth optical flow map to the at least one of the video processor or the video application.

Example 10 includes the at least one non-transitory computer readable medium of example 8 or example 9, wherein the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images, and the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

Example 11 includes the at least one non-transitory computer readable medium of example 10, wherein the reference optical flow map is a first reference optical flow map, the alpha matte is a first alpha matte representative of segmentation of the first one of the stereo pair of input images into foreground and background regions, and the instructions are to cause the programmable circuitry to generate a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images, generate a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images, merge the second reference optical flow map and the third optical flow map based on a second alpha matte to generate a fourth optical flow map associated with the stereo pair of input images, the second alpha matte representative of segmentation of the second one of the stereo pair of input images into foreground and background regions, and output the fourth optical flow map to the at least one of the video processor or the video application.

Example 12 includes the at least one non-transitory computer readable medium of example 10, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and to merge the reference optical flow map and the first optical flow map, the instructions are to cause the programmable circuitry to merge one of the elements of the reference optical flow map with a corresponding one of the elements of the first optical flow map based on a corresponding one of the elements of the alpha matte.

Example 13 includes the at least one non-transitory computer readable medium of example 12, wherein the corresponding one of the elements of the alpha matte has a value in a range from zero to one, and to merge the one of the elements of the reference optical flow map with the corresponding one of the elements of the first optical flow map, the instructions are to cause the programmable circuitry to multiply a value of the one of the elements of the reference optical flow map by the value of the corresponding one of the elements of the alpha matte subtracted from one to determine a first quantity, multiply a value of the corresponding one of the elements of the first optical flow map with the value of the corresponding one of the elements of the alpha matte to determine a second quantity, and add the first quantity and the second quantity to determine a value of a corresponding one of a plurality of elements included in the second optical flow map.

Example 14 includes the at least one non-transitory computer readable medium of example 8, wherein to merge the reference optical flow map and the first optical flow map, the instructions are to cause the programmable circuitry to merge respective elements of the reference optical flow map with corresponding elements of the first optical flow map based on corresponding elements of the alpha matte to determine corresponding elements of the second optical flow map.

Example 15 includes a method to generate optical flow maps, the method comprising generating, by executing an instruction with programmable circuitry, a reference optical flow map based on a stereo pair of background images corresponding to a first camera field-of-view and a second camera field-of-view, generating, by executing an instruction with the programmable circuitry, a first optical flow map based on a stereo pair of input images corresponding to the first camera field-of-view and the second camera field-of-view, combining, by executing an instruction with the programmable circuitry, the reference optical flow map and the first optical flow map based on an alpha matte to generate a second optical flow map associated with the stereo pair of input images, the alpha matte representative of segmentation of at least one of the stereo pair of input images into foreground and background regions, and outputting the second optical flow map to at least one of a video processor or a video application.

Example 16 includes the method of example 15, wherein the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images, and the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

Example 17 includes the method of example 16, wherein the reference optical flow map is a first reference optical flow map, the alpha matte is a first alpha matte representative of segmentation of the first one of the stereo pair of input images into foreground and background regions, and the further including generating a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images, generating a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images, combining the second reference optical flow map and the third optical flow map based on a second alpha matte to generate a fourth optical flow map associated with the stereo pair of input images, the second alpha matte representative of segmentation of the second one of the stereo pair of input images into foreground and background regions, and outputting the fourth optical flow map to the at least one of the video processor or the video application.

Example 18 includes the method of example 16, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and the combining of the reference optical flow map and the first optical flow map includes combining one of the elements of the reference optical flow map with a corresponding one of the elements of the first optical flow map based on a corresponding one of the elements of the alpha matte.

Example 19 includes the method of example 18, wherein the corresponding one of the elements of the alpha matte has a value in a range from zero to one, and the combining of the one of the elements of the reference optical flow map with the corresponding one of the elements of the first optical flow map includes multiply a value of the one of the elements of the reference optical flow map by the value of the corresponding one of the elements of the alpha matte subtracted from one to determine a first quantity, multiply a value of the corresponding one of the elements of the first optical flow map with the value of the corresponding one of the elements of the alpha matte to determine a second quantity, and add the first quantity and the second quantity to determine a value of a corresponding one of a plurality of elements included in the second optical flow map.

Example 20 includes the method of example 15, wherein the combining of the reference optical flow map and the first optical flow map including combining respective elements of the reference optical flow map with corresponding elements of the first optical flow map based on corresponding elements of the alpha matte to determine corresponding elements of the second optical flow map.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to generate optical flow maps, the apparatus comprising:
- interface circuitry;
- machine readable instructions; and
- programmable circuitry to execute the machine readable instructions to at least:
  - generate a reference optical flow map based on a stereo pair of background images corresponding to a first camera field-of-view and a second camera field-of-view;
  - generate a first optical flow map based on a stereo pair of input images corresponding to the first camera field-of-view and the second camera field-of-view;
  - combine the reference optical flow map and the first optical flow map based on an alpha matte to generate a second optical flow map associated with the stereo pair of input images, the alpha matte representative of segmentation of at least one of the stereo pair of input images into foreground and background regions; and
  - output the second optical flow map to at least one of a video processor or a video application.

2. The apparatus of claim 1, wherein the stereo pair of input images is a first stereo pair of a sequence of stereo pairs of input images, the alpha matte is a first alpha matte, and the programmable circuitry is to:
- generate a third optical flow map based on a second stereo pair of input images in the sequence of stereo pairs of input images;
- combine the reference optical flow map and the third optical flow map based on a second alpha matte to generate a fourth optical flow map associated with the second stereo pair of input images, the second alpha matte representative of segmentation of at least one of the second stereo pair of input images into foreground and background regions; and
- output the fourth optical flow map to the at least one of the video processor or the video application.

3. The apparatus of claim 1, wherein:
- the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images; and
- the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

4. The apparatus of claim 3, wherein the reference optical flow map is a first reference optical flow map, the alpha matte is a first alpha matte representative of segmentation of the first one of the stereo pair of input images into foreground and background regions, and the programmable circuitry is to:
- generate a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images;
- generate a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images;
- combine the second reference optical flow map and the third optical flow map based on a second alpha matte to generate a fourth optical flow map associated with the stereo pair of input images, the second alpha matte representative of segmentation of the second one of the stereo pair of input images into foreground and background regions; and
- output the fourth optical flow map to the at least one of the video processor or the video application.

5. The apparatus of claim 3, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and to combine the reference optical flow map and the first optical flow map, the programmable circuitry is to combine one of the elements of the reference optical flow map with a corresponding one of the elements of the first optical flow map based on a corresponding one of the elements of the alpha matte.

6. The apparatus of claim 5, wherein the corresponding one of the elements of the alpha matte has a value in a range from zero to one, and to combine the one of the elements of the reference optical flow map with the corresponding one of the elements of the first optical flow map, the programmable circuitry is to:
- multiply a value of the one of the elements of the reference optical flow map by the value of the corresponding one of the elements of the alpha matte subtracted from one to determine a first quantity;
- multiply a value of the corresponding one of the elements of the first optical flow map with the value of the corresponding one of the elements of the alpha matte to determine a second quantity; and
- add the first quantity and the second quantity to determine a value of a corresponding one of a plurality of elements included in the second optical flow map.

7. The apparatus of claim 1, wherein to combine the reference optical flow map and the first optical flow map, the programmable circuitry is to combine respective elements of the reference optical flow map with corresponding elements of the first optical flow map based on corresponding elements of the alpha matte to determine corresponding elements of the second optical flow map.

8. At least one non-transitory computer readable medium comprising computer readable instructions to cause programmable circuitry to at least:

generate a reference optical flow map based on a stereo pair of background images corresponding to a first camera field-of-view and a second camera field-of-view;

generate a first optical flow map based on a stereo pair of input images corresponding to the first camera field-of-view and the second camera field-of-view;

merge the reference optical flow map and the first optical flow map based on an alpha matte to generate a second optical flow map associated with the stereo pair of input images, the alpha matte representative of segmentation of at least one of the stereo pair of input images into foreground and background regions; and output the second optical flow map to at least one of a video processor or a video application.

9. The at least one non-transitory computer readable medium of claim 8, wherein the stereo pair of input images is a first stereo pair of a sequence of stereo pairs of input images, the alpha matte is a first alpha matte, and the instructions are to cause the programmable circuitry to:

generate a third optical flow map based on a second stereo pair of input images in the sequence of stereo pairs of input images;

merge the reference optical flow map and the third optical flow map based on a second alpha matte to generate a fourth optical flow map associated with the second stereo pair of input images, the second alpha matte representative of segmentation of at least one of the second stereo pair of input images into foreground and background regions; and output the fourth optical flow map to the at least one of the video processor or the video application.

10. The at least one non-transitory computer readable medium of claim 8, wherein the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images; and the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

11. The at least one non-transitory computer readable medium of claim 10, wherein the reference optical flow map is a first reference optical flow map, the alpha matte is a first alpha matte representative of segmentation of the first one of the stereo pair of input images into foreground and background regions, and the instructions are to cause the programmable circuitry to:

generate a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images;

generate a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images;

merge the second reference optical flow map and the third optical flow map based on a second alpha matte to generate a fourth optical flow map associated with the stereo pair of input images, the second alpha matte representative of segmentation of the second one of the stereo pair of input images into foreground and background regions; and output the fourth optical flow map to the at least one of the video processor or the video application.

12. The at least one non-transitory computer readable medium of claim 10, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and to merge the reference optical flow map and the first optical flow map, the instructions are to cause the programmable circuitry to merge one of the elements of the reference optical flow map with a corresponding one of the elements of the first optical flow map based on a corresponding one of the elements of the alpha matte.

13. The at least one non-transitory computer readable medium of claim 12, wherein the corresponding one of the elements of the alpha matte has a value in a range from zero to one, and to merge the one of the elements of the reference optical flow map with the corresponding one of the elements of the first optical flow map, the instructions are to cause the programmable circuitry to:

multiply a value of the one of the elements of the reference optical flow map by the value of the corresponding one of the elements of the alpha matte subtracted from one to determine a first quantity;

multiply a value of the corresponding one of the elements of the first optical flow map with the value of the corresponding one of the elements of the alpha matte to determine a second quantity; and add the first quantity and the second quantity to determine a value of a corresponding one of a plurality of elements included in the second optical flow map.

14. The at least one non-transitory computer readable medium of claim 8, wherein to merge the reference optical flow map and the first optical flow map, the instructions are to cause the programmable circuitry to merge respective elements of the reference optical flow map with corresponding elements of the first optical flow map based on corresponding elements of the alpha matte to determine corresponding elements of the second optical flow map.

15. A method to generate optical flow maps, the method comprising:

generating, by executing an instruction with programmable circuitry, a reference optical flow map based on a stereo pair of background images corresponding to a first camera field-of-view and a second camera field-of-view;

generating, by executing an instruction with the programmable circuitry, a first optical flow map based on a stereo pair of input images corresponding to the first camera field-of-view and the second camera field-of-view;

combining, by executing an instruction with the programmable circuitry, the reference optical flow map and the first optical flow map based on an alpha matte to generate a second optical flow map associated with the stereo pair of input images, the alpha matte representative of segmentation of at least one of the stereo pair of input images into foreground and background regions; and outputting the second optical flow map to at least one of a video processor or a video application.

16. The method of claim 15, wherein:

the reference optical flow map includes elements corresponding respectively to pixels of a first one of the stereo pair of background images, ones of the elements of the reference optical flow map including respective displacement vectors to map ones of the pixels of the first one of the stereo pair of background images to corresponding pixels of the second one of the stereo pair of background images; and the first optical flow map includes elements corresponding respectively to pixels of a first one of the stereo pair of input images, ones of the elements of the first optical flow map including respective displacement vectors to map ones of the pixels of the first one of the stereo pair of input images to corresponding pixels of the second one of the stereo pair of input images.

17. The method of claim 16, wherein the reference optical flow map is a first reference optical flow map, the alpha matte is a first alpha matte representative of segmentation of the first one of the stereo pair of input images into foreground and background regions, and the further including:

generating a second reference optical flow map based on the stereo pair of background images, the second reference optical flow map including elements corresponding respectively to the pixels of the second one of the stereo pair of background images, ones of the elements of the second reference optical flow map including respective displacement vectors to map ones of the pixels of the second one of the stereo pair of background images to the corresponding pixels of the first one of the stereo pair of background images;

generating a third optical flow map based on the stereo pair of input images, the third optical flow map including elements corresponding respectively to the pixels of the second one of the stereo pair of input images, ones of the elements of the third optical flow map including respective displacement vectors to map ones of the pixels of the second one of the stereo pair of input images to the corresponding pixels of the first one of the stereo pair of input images;

combining the second reference optical flow map and the third optical flow map based on a second alpha matte to generate a fourth optical flow map associated with the stereo pair of input images, the second alpha matte representative of segmentation of the second one of the stereo pair of input images into foreground and background regions; and outputting the fourth optical flow map to the at least one of the video processor or the video application.

18. The method of claim 16, wherein the alpha matte includes elements corresponding respectively to the pixels of the first one of the stereo pair of input images, the elements of the alpha matte representative of segmentation of the corresponding pixels of the first one of the stereo pair of input images into the foreground and background regions, and the combining of the reference optical flow map and the first optical flow map includes combining one of the elements of the reference optical flow map with a corresponding one of the elements of the first optical flow map based on a corresponding one of the elements of the alpha matte.

19. The method of claim 18, wherein the corresponding one of the elements of the alpha matte has a value in a range from zero to one, and the combining of the one of the elements of the reference optical flow map with the corresponding one of the elements of the first optical flow map includes:

multiply a value of the one of the elements of the reference optical flow map by the value of the corresponding one of the elements of the alpha matte subtracted from one to determine a first quantity;

multiply a value of the corresponding one of the elements of the first optical flow map with the value of the corresponding one of the elements of the alpha matte to determine a second quantity; and add the first quantity and the second quantity to determine a value of a corresponding one of a plurality of elements included in the second optical flow map.

20. The method of claim 15, wherein the combining of the reference optical flow map and the first optical flow map including combining respective elements of the reference optical flow map with corresponding elements of the first optical flow map based on corresponding elements of the alpha matte to determine corresponding elements of the second optical flow map.

* * * * *